United States Patent [19]

Shambayati

[11] Patent Number: 5,763,791
[45] Date of Patent: *Jun. 9, 1998

[54] FLOWMETER

[75] Inventor: Ali Shambayati, Phoenix, Ariz.

[73] Assignee: The Rosaen Company, Hazel Park, Mich.

[ * ] Notice: The term of this patent shall not extend beyond the expiration date of Pat. No. 5,576,498.

[21] Appl. No.: 752,318

[22] Filed: Nov. 19, 1996

Related U.S. Application Data

[63] Continuation-in-part of Ser. No. 551,371, Nov. 1, 1995, Pat. No. 5,576,498.

[51] Int. Cl.$^6$ ............................................. G01F 1/37
[52] U.S. Cl. ............................................. 73/861.52
[58] Field of Search ........................ 73/861.52, 861.22, 73/202.5

[56] References Cited

U.S. PATENT DOCUMENTS

| | | |
|---|---|---|
| 1,559,547 | 11/1925 | Brown . |
| 1,870,849 | 8/1932 | Hodgson . |
| 2,729,976 | 1/1956 | Laub . |
| 3,037,384 | 6/1962 | Good . |
| 3,071,001 | 1/1963 | Goldsmith . |
| 3,071,160 | 1/1963 | Weichbrod . |
| 3,240,233 | 3/1966 | Johnston . |
| 3,321,970 | 5/1967 | Walker et al. . |
| 3,443,434 | 5/1969 | Baker et al. . |
| 3,514,074 | 5/1970 | Self . |
| 3,559,482 | 2/1971 | Baker et al. . |
| 3,613,448 | 10/1971 | Benson et al. . |
| 3,792,609 | 2/1974 | Blair et al. ................ 73/205 |
| 3,838,598 | 10/1974 | Tompkins ................ 73/205 |
| 3,851,520 | 12/1974 | Schluter et al. ............ 73/23 |
| 3,851,526 | 12/1974 | Drexel ................... 73/202 |
| 3,917,222 | 11/1975 | Kay et al. ............... 251/127 |
| 3,938,384 | 2/1976 | Blair .................... 73/204 |
| 4,118,973 | 10/1978 | Tucker et al. ............. 73/55 |
| 4,312,236 | 1/1982 | Mahany et al. .......... 73/861.22 |
| 4,427,030 | 1/1984 | Jouwsma ................ 138/42 |
| 4,450,718 | 5/1984 | Hartemink .............. 73/202 |
| 4,461,173 | 7/1984 | Olin ................... 73/203 |
| 4,487,062 | 12/1984 | Olin et al. .............. 73/202 |
| 4,497,202 | 2/1985 | Mermelstein ............ 73/202 |
| 4,522,058 | 6/1985 | Ewing .................. 73/202 |
| 4,524,616 | 6/1985 | Drexel et al. ............ 73/203 |
| 4,800,754 | 1/1989 | Korpi .................. 73/202 |
| 5,297,427 | 3/1994 | Shambayati ............. 73/203 |

Primary Examiner—Richard Chilcot
Assistant Examiner—Jewel Artis
Attorney, Agent, or Firm—Lyon, P.C.

[57] ABSTRACT

A fluid flowmeter comprises a frame having a cavity that is open to one side thereof for the acceptance of a laminar flow module and open to the other side for the acceptance of sensing electronics that measure pressure drop across the module. The module comprises a plurality of plates that are spaced apart by wires and bound to one another to form a unitary assembly that facilitates exchange and replacement.

4 Claims, 2 Drawing Sheets

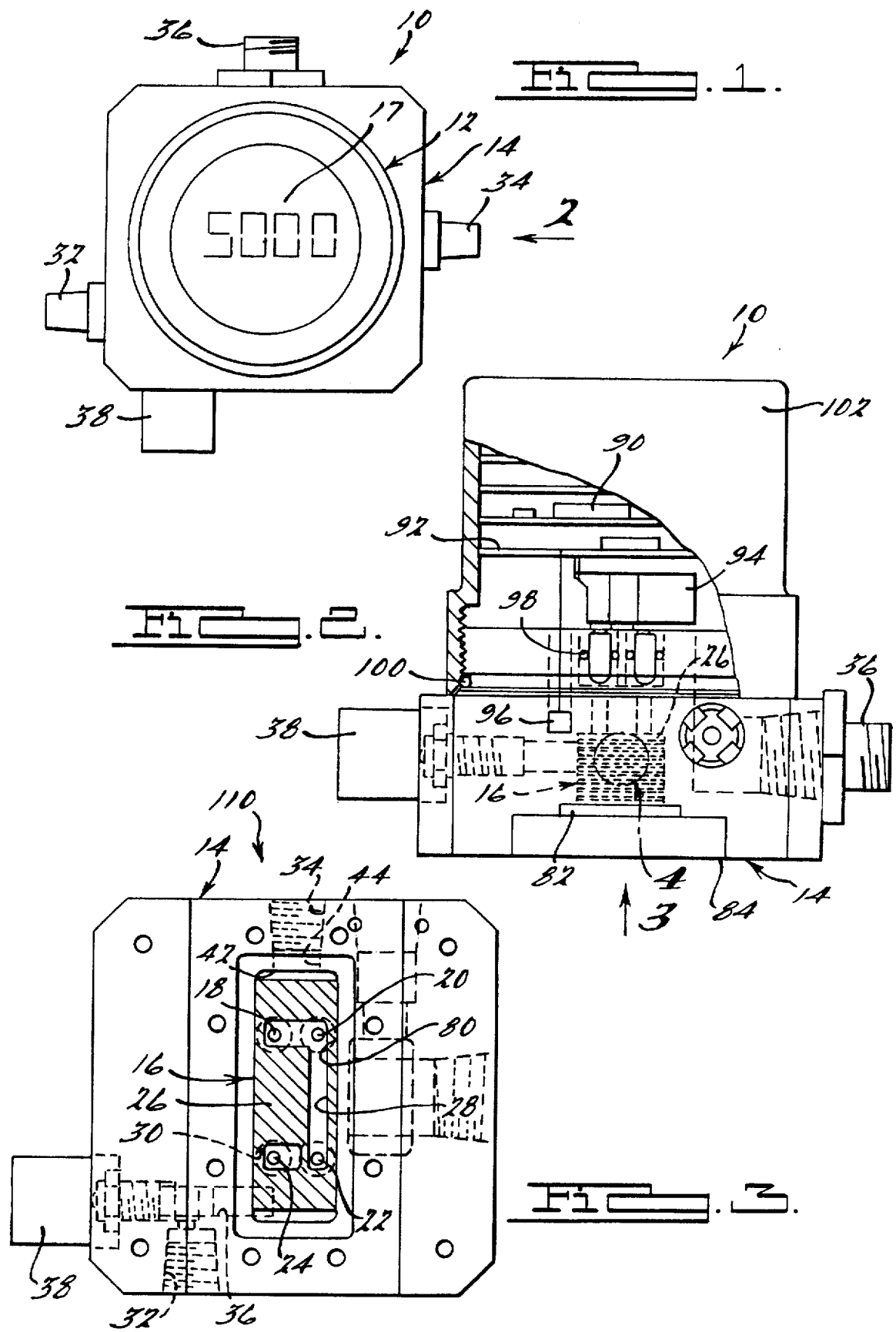

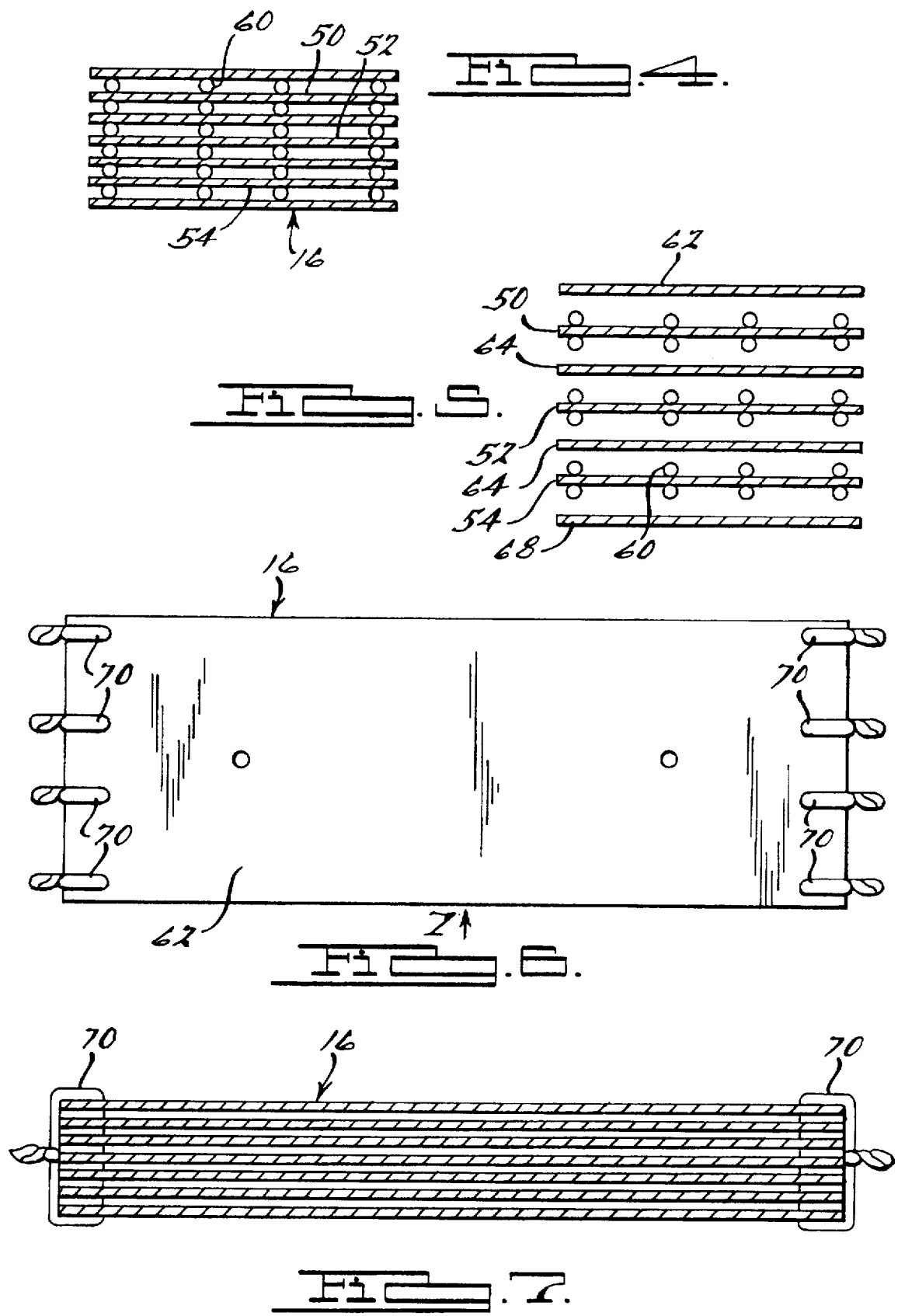

FLOWMETER

BACKGROUND OF THE INVENTION

This application is a continuation-in-part of patent application Ser. No. 08/551,371, filed on Nov. 1, 1995, now U.S. Pat. No. 5,576,498.

The present invention relates generally to flowmeters and more particularly to an improved frame for a fluid flowmeter that accommodates the electronic components and an improved laminar flow module in a novel relationship.

Flowmeters use the linear relationship between fluid flow rate and static pressure drop to measure the flow. Typically, flowmeters employ a laminar flow element to develop a pressure drop in a shunt path around the flow element thereby to effect flow measurement.

One problem associated with known flowmeters is that metering of different fluids and flow rates requires that the laminar flow element be changed which is relatively expensive in terms of both manufacturing cost and time lost due to flowmeter disassembly and reassembly.

While flowmeters that provide for mechanical adjustment of the laminar flow element are known, the high cost of manufacturing such devices is prohibitive in the highly competitive low cost flowmeter market. Moreover, the time spent incident to calibration substantially increases the operational cost of such flowmeters.

The aforementioned problems associated with the production and use of known flowmeters emphasizes the need for a rugged, low cost, precision flowmeter that optimizes field efficiency.

Accordingly, the broad object of the present invention is an improved flowmeter having a precision laminar flow module that can be mass produced at relatively low cost.

Another object of the present invention is a flowmeter that is relatively easy to recalibrate by changing the laminar flow module thereof without the need for removal of he electronic components form the flowmeter frame.

Yet another object of the invention to provide a laminar flow module the is relatively simple to produce.

SUMMARY OF THE INVENTION

A flowmeter in accordance with a preferred and constructed embodiment of the present invention comprises a rectangular frame for the support of both a laminar flow module and an electronic module that senses the rate of fluid flow and displays indicia reflecting said rate of fluid flow. Access to the laminar flow module is from an opposite side of the frame from the electronic module thereby facilitating change of the flow module and calibration of the flowmeter without disassembly of the electronic module.

The laminar flow module comprises a plurality of laminar flow plates that are spaced apart by wires and stacked to produce a relatively large flow passage area so as to allow for different full scale flow rates. The plates are secured to one another to form a module for ease of handling and assembly.

BRIEF DESCRIPTION OF THE DRAWINGS

The preferred embodiment is best understood by reference to the accompanying drawing, wherein:

FIG. 1 is a top view of a flowmeter in accordance with a preferred embodiment of the invention;

FIG. 2 is a view taken in the direction of the arrow 2 3 of FIG. 2;

FIG. 3 is a bottom view taken in the direction of the arrow 3 of FIG. 2;

FIG. 4 is a view taken within the circle 4 of FIG. 2;

FIG. 5 is an exploded view similar to FIG. 4;

FIG. 6 is a view taken in the direction of the arrow 6 of FIG. 4; and

FIG. 7 is a view taken in the direction of the arrow 7 of FIG. 6;

DETAILED DESCRIPTION OF THE PREFERRED EMBODIMENT(S)

Referring to FIG. 1, and 2, a flow meter 10 comprises an electronic sensing and display module 12, a frame 14, and a laminar flow element 16. The display module 12 indicates the rate of fluid flow through the flowmeter 10 by digital indicia 17.

As seen in FIG. 3, the frame 14 has two pairs of spaced passages 18, 20, 22 and 24 for diverting a portion of the fluid flowing through the laminar flow module 16 to and from the sensing and display module 12. The passages 18 and 20 are absolute pressure sensor ports. The passage 22 is a differential low pressure sensor port and the passage 24 is a differential high pressure sensor port. Only a relatively small fraction of total flow through the laminar flow module 16 is diverted through the passages 18, 20, 22 and 24. Passages 18, 20 and 22 are isolated from passage 24 by a gasket 26 that is interposed between the laminar flow module 16 and frame 14. The gasket 26 has an aperture 28 therein which communicates with the passages 18, 20 and 22 and an aperture 30 which communicates with the passage 24.

As best seen in FIG. 1 the frame 14 of the laminar flow meter 10 is provided with a fluid inlet 32 and a fluid outlet 34 for connection of the flowmeter 10 to a fluid source and to apparatus utilizing such flow, not shown. A power and signal connecter 36 and control valve 38 are also mounted on the frame 14. As best seen in FIG. 3, fluid entering the frame 14 through the inlet 32 is transported by a passage 36 to a cavity 40 thence longitudinally through the laminar flow module 16, to a cavity 42 thence through a passage 44 to the exit port 34.

In accordance with one feature of the invention, and as best seen in FIGS. 5 through 8, the laminar flow module 16 comprises a plurality of carrier plates 50, 52 and 54 having a plurality of wires, generally designed by the numeral 60, supported thereon that effect spacing of plates 62, 64, 66 and 68 from the carrier plates 50, 52 and 54. The wires 60 may be secured to the carrier plates 50, 52 and 54 as by welding, gluing, or winding. The plates 50–54 and 62–68 are secured to one another by wires 70 so as to form a laminar flow module that is easily assembled into the frame 14 of the flowmeter 10.

In accordance with another feature of the invention, the laminar flow module is accepted in a cavity 80 in the frame 14 that opens on the opposite side thereof from the sensor and display module 12. The cavity 80 is sealed by a gasket 82 and closed by a bottom plate 84.

With respect to the electronic sensor and display module 12, fluid flow is measured and displayed by the output from a microprocessor board 90 which integrates signals from a pre-amplifier board 92, pressure sensor 94, and temperature sensor 96. Suitable pressure sensor O-rings 98 and a cover O-ring 100 seal the sensors 94 and 96 and a cover 102 of the electronic module to the frame 14.

While the preferred embodiment of the invention has been disclosed, it should be appreciated that the invention is susceptible of modification without departing form the scope of the following claims:

I claim:

1. A fluid flowmeter comprising a frame having an internal cavity, a fluid inlet at one end of the cavity, a fluid outlet at the other end of the cavity, flow sensing and indicating means communicating with the cavity through an opening in one side of said frame, and, a laminar flow module in said cavity capable of assembly through the opening on an opposite side of said frame, from said one side, said laminar flow module comprising a first plurality of flat plates having a plurality of wires thereon disposed in spaced parallel relation so as to define a plurality of laminar flow channels extending between the inlet and outlet of the cavity in said housing and a second plurality of plates disposed between said first plates, respectively.

2. A fluid flowmeter in accordance with claim 1 wherein the wires on said first plates are secured thereto by welding.

3. A fluid flowmeter in accordance with claim 1 wherein the wires on said first plates are wound about said first plates.

4. A fluid flowmeter in accordance with claim 1 wherein said laminar flow module comprises a plurality of plates that are secured to one another in stacked relationship by wires extending therethrough.

* * * * *